United States Patent [19]

Hutchinson

[11] Patent Number: 4,485,203

[45] Date of Patent: Nov. 27, 1984

[54] PRODUCTION OF VERMICULITE PRODUCTS AND SUSPENSION FOR USE THEREIN

[75] Inventor: John Hutchinson, Frodsham, England

[73] Assignee: Imperial Chemical Industries PLC, London, England

[21] Appl. No.: 468,710

[22] Filed: Feb. 22, 1983

[30] Foreign Application Priority Data

Mar. 3, 1982 [GB] United Kingdom ................. 8206238

[51] Int. Cl.$^3$ ............................................... C08K 3/34
[52] U.S. Cl. ..................................... 524/414; 524/449; 524/450
[58] Field of Search ........................ 524/450, 449, 414

[56] References Cited

U.S. PATENT DOCUMENTS

| | | | |
|---|---|---|---|
| 3,916,057 | 10/1975 | Hatch et al. ........................ | 524/450 |
| 4,190,547 | 2/1980 | Mahnke et al. ....................... | 252/62 |
| 4,305,992 | 12/1981 | Langer et al. ........................ | 524/450 |
| 4,425,465 | 1/1984 | Padget et al. ........................ | 524/450 |

FOREIGN PATENT DOCUMENTS 56 6/1978 European Pat. Off. .

*Primary Examiner*—Lewis T. Jacobs
*Attorney, Agent, or Firm*—Cushman, Darby & Cushman

[57] ABSTRACT

A process for producing solid vermiculite products which are stable in water which comprises incorporating a urea-formaldehyde or melamine-formaldehyde resin in an aqueous suspension of vermiculite lamellae, shaping the suspension and removing water from the suspension, and curing the shaped composition by heating during and/or after removal of water from the suspension. The invention includes an aqueous suspension of vermiculite lamellae having a resin incorporated therein and a dry-powder mixture of vermiculite lamellae and a resin.

6 Claims, No Drawings

PRODUCTION OF VERMICULITE PRODUCTS AND SUSPENSION FOR USE THEREIN

This invention relates to a process for the production of solid vermiculite products which are stable in water and to vermiculite suspensions suitable for the production of solid products which are stable in water.

It is known that granules of the layer mineral vermiculite can be chemically delaminated by treatment with aqueous solutions of salts followed by soaking in water and then mechanically shearing the swollen granules in water to form a suspension of extremely thin platelets known as vermiculite lamellae. Processes for the delamination of vermiculite are described, for example, in United Kingdom patent specifications Nos. 1,016,385; 1,119,305; 1,585,104 and 1,593,382.

It is also known, as is described for example in the above references, that the suspension of vermiculite lamellae obtained by chemical delamination of vermiculite can be used to form solid products such as sheets or papers and rigid foams of cellular structure by shaping the suspension and removing water from it; in the case of rigid foams the suspension is gasified prior to the removal of water from it.

Solid products made as described above posess a degree of structural integrity resulting from the mutual attraction of vermiculite lamellae, but suffer from the disadvantage that they lack stability in water and in fact disintegrate if exposed to water for prolonged periods. It has been proposed in United Kingdom patent specification No. 1,016,385 to render vermiculite sheet products water-stable by treating the sheet subsequent to its formation with an aqueous solution of an electrolyte, for example magnesium chloride, and thereafter removing the water from the treated sheet. It has also been proposed in U.S. patent specification No. 4,219,609 to impart water-stability to vermiculite products by treating the products after their formation with ammonia or with the vapour of an amine. These post-treatments of vermiculite products do result in an improvement in the water-stability of the products but it is clearly desirable to avoid the need for a post-treatment of products and to produce water-stable products directly.

A process for producing water-stable vermiculite products directly by incorporating in the suspension used to form the products a solid particulate additive having a basic reaction in water, preferably an oxide or hydroxide of calcium or magnesium, is described in our U.S. Pat. No. 4,269,628. The product obtained using this process has excellent water-stability and in addition exhibits improved strength compared with products not including the additive. However, the process suffers from the disadvantage that the suspension tends to flocculate on addition of the additive and moreover has a limited shelf-like after incorporation therein of the additive such that it needs to be shaped quickly, preferably immediately, into the desired product form.

The present invention resides in a process for the production of water-stable vermiculite products which obviates the disadvantages of the known processes.

According to the invention there is provided a process for the production of solid vermiculite products which are stable in water which comprises shaping an aqueous suspension of vermiculite lamellae and removing water from the suspension wherein prior to removal of water from the suspension there is incorporated in the suspension a urea-formaldehyde resin or a melamine-formaldehyde resin and wherein during and/or after removal of water from the suspension, the shaped composition is cured.

Curing of the composition may be, for example, by heating the composition during and/or subsequent to removal of water from the composition.

By the term "vermiculite" as used herein we mean all minerals known commercially and mineralogically as vermiculite or as containing vermiculite-type layers, for example chlorites and chlorite vermiculites.

By the term "vermiculite lamellae" we mean tiny particles of chemically delaminated vermiculite that are platelets having a thickness of less than one tenth of a micron, usually less than one hundredth of a micron, and an aspect ratio (length or breadth $\div$ thickness) of at least 10, preferably at least 100 and more preferably at least 1000.

The urea-formaldehyde resin or the melamine formaldehyde resin can be incorporated in the suspension at any stage during production or use of the suspension. Usually the resin will be added to a pre-formed suspension since this is the most convenient method of operation, but if desired it can be added to the swollen vermiculite granules in water before these are delaminated by shearing so that the resin is incorporated during production of the suspension. In the case where the suspension is gasified to form a wet foam or froth prior to forming a dry rigid foam product, the resin can be incorporated prior to, during or subsequent to gasification of the suspension. However since addition of the resin to the suspension does not seriously impair the stability, shelf life or capability for gasification of the suspension, the resin is most conveniently incorporated in the suspension prior to gasification thereof.

The resin may be added directly to the suspension or it may be added as a solution in a suitable solvent. The resin is not strongly cationic and we have found that large amounts can be incorporated in the suspension of vermiculite lamellae without causing immediate or rapid flocculation of the suspension. Moreover the suspension incorporating the resin is stable and can be stored for prolonged periods, for example several months, without flocculation.

Suspensions of vermiculite lamellae can be prepared by dispersing in water vermiculite lamellae in the form of a free-flowing dry powder or tablets obtained by compacting dry or damp powder for ease of handling and transport. In this case, the resin required in the suspension can be mixed with the vermiculite powder and a feature of the present invention comprises a free-flowing dry powder composition comprising a mixture of vermiculite lamellae and a urea formaldehyde resin or a melamine-formaldehyde resin. Tablets formed by compacting the mixed powders are also provided.

An aqueous suspension of vermiculite lamellae having a urea-formaldehyde resin or a melamine-formaldehyde resin incorporated therein is another feature of the present invention.

The amount of the resin incorporated in the suspension will usually be in the range of from 1% to 20% by weight, typically from 2% to 10% by weight based on the weight of vermiculite in the suspension, although amounts outside this range may be employed if desired. In general, however, we have observed that whilst amounts of less than 2% by weight do produce a stabilising effect, such amounts tend to result in a product of unsatisfactory water-stability for most practical applications, and that there is little value in using an amount greater than 20% by weight based on the vermiculite in the suspension. The amount of vermiculite in the suspension may vary within a wide range but typically will be from 0.5% to 50% by weight of the suspension. Suspensions containing a high proportion of vermiculite lamellae, if desired stabilized by incorporation of a deflocculating agent, may be viscous liquids or paste-like compositions and it is to be understood that the term 'suspension' as used herein includes such viscous compositions. A viscosity-modifying agent such as sodium pyrophosphate may be incorporated in the suspension so that the suspension is mobile and pourable even when it contains a high proportion, for example 35% by weight, of vermiculite lamellae.

It is preferred that at least the major proportion and preferably substantially all of the vermiculite lamellae in the suspension be of size below 50 microns, preferably below 20 microns, and if desired the suspension of vermiculite lamellae may be classified by elimination of particles of size greater than 50 microns (20 microns) before the suspension is converted into a shaped solid product. Classification of suspensions of vermiculite lamellae is known and is described for example in our United Kingdom patent specification No. 1,593,382.

Removal of water from the aqueous suspension of vermiculite lamellae to form solid products usually is mainly be evaporation, often assisted by heating. In the present invention the suspension may be heated during removal of water at a temperature sufficient to cure or at least commence curing of the composition as it dries. For example, the shaped suspension may be heated at a temperature greater than say 80° C. to remove the water and at least commence curing of the composition. However, if desired, the shaped composition may be dried at low temperature such that curing of the composition is not appreciably effected and the dry composition may be heated subsequently to effect curing of the composition. Thus for example the composition may be dried at from room temperature up to say 60° C. without appreciably curing the composition which may be cured subsequently by heating the composition at a higher temperature. Furthermore, it is not essential to heat the composition to effect curing which will occur slowly at room temperature, but for practical purposes heating will usually be applied in order to effect an acceptable rate of cure of the composition. In general, up to about 150° C. to 160° C., increasing the temperature increases the rate of cure of the resin. Usually the curing temperature will be above 100° C. since at lower temperatures the time for which it is necessary to heat the product to ensure that the inner regions are rendered water-stable may be unduly long, for example several hours or even days depending upon the thickness of the product. We especially prefer to employ temperatures about 150° C. to 160° C. in order to raise the temperature of the drying suspension/product rapidly and to ensure that the interior of the suspension/product reaches a temperature at which it is cured rapidly. If desired the suspension/product may be heated under an increased pressure but this will not generally be necessary.

A wide variety of forms of vermiculite products may be rendered water-stable by the treatment of the invention, including for example sheets and papers, rigid foams, mouldings and coatings. In addition to imparting water-stability to the products, the incorporation of the resin improves the strength of the products, for example the tensile strength of sheet materials. Product forms comprising substrates impregnated and/or coated with vermiculite are included and one particular product form of this type is a composite material comprising fibres and vermiculite lamellae as described in European patent applications Nos. 44160 A1, 44161 A1 and 44178 A1. The fibres may be natural fibres or man-made fibres, organic or inorganic and the composites may be individual fibres coated with vermiculite or an assembly of fibres such as a woven, knitted or felted fabric or tissue impregnated with and/or coated with vermiculite. A lightweight three-dimensional block of foam-like structure (although not a true foam) comprising an assembly of fibres coated with vermiculite is another specific embodiment of a composite material which can be provided by the process of the invention. Laminates of a vermiculite-containing product form such as a sheet, foam or fibrous composite with a substrate such as a polymer or plastics film, metal, wood and concrete are also provided.

It will be appreciated from the product forms described that by shaping the aqueous suspension of vermiculite lamellae we include operations such as applying the suspension as a coating to substrates, impregnating substrates with the suspension and using the suspension as an adhesive as well as more obvious shaping operations such as casting and moulding.

The suspension may, if desired, contain other additives, for example fillers and especially lightweight or reinforcing fillers such as silica, fibre (e.g. glass fibre) glass microballoons (e.g. "Cenospheres" or "Ecospheres") perlite, kaolin and fly-ash.

The invention is illustrated but in no way limited by the following examples in which the vermiculite suspensions employed were aqueous suspensions of vermiculite lamellae classified by elimination of particles of size greater than 50 microns and produced by the following general procedure:

Production of vermiculite suspensions

150 Parts of vermiculite ore (Mandoval micron grade ex-South Africa) are agitated with saturated sodium chloride solution in 1:2 ratio in a tank for 30 minutes at 80° C. This suspension is then centrifuged and washed with deionised water. The wet cake is transferred to a second tank where the vermiculite is stirred with 1.5N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling the suspension is approximately 20% solids and the particles random sized in the range 300–400 micron. This suspension is then passed through a stone-type mill which reduces approximately 50% particles to less than 50 microns. This milled suspension is classified in a weir-type centrifugal classifier and the lighter particles with sieve size less than 50 micron collected for use. Analysis of this 18–21% solids suspension by photosedimentometer and disc centrifuge reveals approximately 40% particles having a size ("equivalent spherical diameter") of 0.4–1.0 micron. The solids content of the suspension is readily adjusted by adding water to it or removing water from it.

EXAMPLE 1

To a stirred suspension of butylammonium vermiculite (20.3% by weight solids) was added Manoxol OT (dioctyl ester of sodium sulphosuccinic acid—0.3% by weight based on vermiculite) sodium pyrophosphate (0.3% by weight based on vermiculite) and a water-soluble, non-ionic, methylated melamine-formaldehyde resin available as BC 336 from British Industrial Plastics Ltd (5% by weight as supplied=3.8% by weight active resin based on vermiculite).

The suspension was then applied to a glass-fibre tissue by a knife-on-roll technique using a knife/tissue gap and line speed such as to provide a vermiculite loading on the tissue of about 100 gm/m$^2$. The wet, coated tissue was dried by passage through a 6 meter air oven which was heated at 230° C.

Squares of size 10 cms×10 cms were cut from the dried, coated tissue and weighed. Two weighed squares were then soaked in tap water overnight, after which they were rinsed in fresh water, wiped gently with a paper towel, rinsed again with water, dried and re-weighed.

For purposes of comparison a sample of the same glass-fibre tissue was coated with a vermiculite suspension similar to the above except that it did not contain the melamine-formaldehyde resin.

Results:

| Sample | M-F resin content (% w/w based on vermiculite) | Weight 1 (gms) | Weight 2 (gms) | Weight % loss |
|--------|-----------------------------------------------|----------------|----------------|---------------|
| I      | 3.8                                           | 98.7           | 98.2           | <1            |
| II     | 3.8                                           | 104.6          | 104            | <1            |
| III    | 0                                             | 105.5          | 51.5           | 51            |
| IV     | 0                                             | 105.5          | 51.3           | 51            |

Weights 1 and 2 are respectively the weights of vermiculite on the samples of coated tissue before and after the treatment in water.

EXAMPLE 2

To a stirred, suspension of butylammonium vermiculite (1% by weight solids) was added a water-soluble, non-ionic, methylated melamine-formaldehyde resin as described in Example 1 (3.8% by weight active resin on the vermiculite). The suspension was allowed to settle and dry at room temperature, within a bund, on a level glass sheet. The resulting film of vermiculite was removed from the glass, heated to 80° C. for about 3 hours, then heated at 110° C. for 1 hour, and finally heated at 125° C. for 1½ hours. The dry, cured film had a tensile strength of 37 MPa and an initial tensile modulus of 8.3 GPa, and it retained its integrity when put into water. For purposes of comparison, a similar vermiculite film but made without the addition of the melamine-formaldehyde resin to the vermiculite suspension, was treated in the same way. This film had a tensile strength of 25 MPa and an initial tensile modulus of 4.7 GPa and it disintegrated completely and almost immediately when put into water.

EXAMPLE 3

To a butylammonium vermiculite suspension (20% by weight solids) was added sodium pyrophosphate (0.3% by weight on the vermiculite), Manoxol OT (0.3% by weight on the vermiculite) and a water-soluble, non-ionic, urea-formaldehyde resin (BC 706 ex BIP, 10% by weight as supplied based on the vermiculite). Glass-fibre tissue was coated with this composition, using a Meyer bar, and the coated tissue was dried at 80° C. and then further heated at 160° C. for 15 mins. After this treatment, the coated tissue was washed several times in water without any appreciable loss of vermiculite.

For purposes of comparison, a coated glassfibre tissue was similarly prepared but without the urea-formaldehyde resin in the coating composition. Washing this coated tissue in water rapidly removed most of the vermiculite.

I claim:

1. An aqueous suspension of vermiculite lamellae having a urea-formaldehyde resin or a melamine-formaldehyde resin incorporated therein.

2. An aqueous suspension as claimed in claim 1 wherein the amount of the resin is from 2% to 10% by weight based on the weight of vermiculite in the suspension.

3. An aqueous suspension as claimed in claim 1 or claim 2 wherein the major proportion of the vermiculite lamellae are of size below 50 microns.

4. An aqueous suspension as claimed in claim 1 which contains a viscosity-modifying agent.

5. An aqueous suspension as claimed in claim 4 wherein the viscosity-modifying agent is sodium pyrophosphate.

6. An aqueous suspension as claimed in claim 1 which contains a filler.

* * * * *